Patented Aug. 20, 1929.

1,725,629

UNITED STATES PATENT OFFICE.

RODOLPHE ADRIEN GERMAIN, OF PARIS, FRANCE.

PROCESS FOR THE TREATMENT OF SKINS OF ANIMALS CONTAINING CALCIFIED FORMATIONS.

No Drawing. Application filed May 26, 1927, Serial No. 194,538, and in France June 3, 1926.

Within a recent period the manufacturing interests have been engaged in the preparation of the skins of animals of all kinds such as fish, reptiles, batrachians and others, for the manufacture of fancy leather, or even of ordinary leather for shoes, morocco leather goods or the like.

However the preparation of such skins is attended with various difficulties, due to the fact that they contain nodules or tubercles having a stony consistency and aspect which act against the flexibility of the skins and also prevent them from being cut up or sewed in the usual manner.

To obviate such disadvantages, various methods have been proposed whereby the tegument will be entirely freed from such stony tubercles or nodules. This affords a flexible leather which resembles the leather produced from the skins of mammiferous animals, but one of the principal properties of the leather is thus lost, this being the special appearance which is due to the tubercles and which is of an attractive nature, and further, when the said tubercles are removed from the leather it becomes porous and permeable to water, such as would be the case with leather from the skins of mammiferous animals from which the grain side is removed by any means.

All such defects are obviated in my present invention, which relates to a process for the treatment of such skins in which the tubercles are not eliminated but are on the contrary retained, so that the skin will preserve its special character, but I remove the stony consistency of such tubercles in order that the skin will be flexible and can be sewed if this is required.

The said process is based upon the fact that the tubercles are in all cases of a calcareous nature, and may therefore be likened to long formations which are produced within the derm. The process consists in principle in treating the skins of all animals offering these characteristics, i. e. among the fish, the skins of the squalidæ, the raiidæ or the plectognathes, and among the reptiles, the skins of certain saurians and crocodilians, and by extension, even the teguments of tortoises and still further, of the crustaceans, this treatment being carried out by maceration in a liquid adapted to dissolve the insoluble calcareous salts and to transform them into soluble salts which diffuse in the solution; the liquid must be of such nature that it will act progressively upon the calcareous tubercles and will offer no prejudice to the derm, in order that its solidity will not be affected.

By way of example, in order to soften the skin of a fish which contains the aforesaid stony tubercles, I prepare a solution which contains in the proper proportions, firstly a suitable acid not exceeding 2 to 10 per cent strength, and secondly one or more substances which possess fixing properties in the histological sense of the word, such as formol, picric acid, osmic acid, chromic acid, potassium bichromate, corrosive sublimate, and others, or a neutral salt such as the sulphate, nitrate or chloride of sodium or potassium in sufficient quantity to form a solution having a considerable molecular concentration, or which is even saturated, thus preventing all swelling of the collogenic fibres, or I may further employ the known tanning substances. The fixing or tanning bodies serve to protect the conjunctive derm against the prejudicial action of the decalcifying acid.

It is to be noted that hydrochloric acid will not be used when chromic acid, potassium bichromate, or nitrate of sodium, will be employed as fixing bodies, for the purpose to avoid the formation of chlorine which would destroy the tissues.

The skin in the raw state is soaked in this liquid and is moved about, with care, until the calcareous matter has been entirely dissolved. It is then rinsed and if necessary neutralized to eliminate the acid and the other constituents of the bath.

The process is terminated by a suitable tanning by the known methods, and also by other treatment, known per se, adapted to make the leather flexible and to nourish it.

If desired, I might effect the decalcification upon preliminarily tanned skins, and in this case the tanning should be performed with the proper care in order to prevent the mechanical removal of the calcareous formations, and the subsequent decalcification will be performed in an acid bath, avoiding all rough manipulations.

I prefer to add to the acid bath or the tanning bath such substances as glycerin or the like, deliquescent salts, or fatty substances or soaps, which will impregnate the decalcified nodules and obviate all exaggerated hardening when dry.

Having thus described my process what I claim as new therein, and my own invention is:

1. Process for the treatment of the skins of animals containing tubercles or other calcareous formations in order to decalcify the said formations without detaching them and to render the skins capable of being tanned in order to transform them into a leather capable of being worked and having the aspect of the original skin, the said process consisting in macerating the skin to be treated in a solution containing both an acid of a strength of 2 to 10 per cent, which dissolves the calcareous matter and bodies which act on the dermal tissue to prevent the swelling or gelatinizing action of the said acid, and in moving about said skin, with care, in this liquid, until the calcareous matter has been entirely dissolved.

2. Process for the treatment of the skins of animals containing tubercles or other calcareous formations in order to decalcify the said formations without detaching them and to render the skins capable of being tanned in order to transform them into a leather capable of being worked and having the aspect of the original skin, the said process consisting in macerating the skin to be treated in a solution containing both an acid of a strength of 2 to 10 per cent, which dissolves the calcareous matter and fixing bodies which prevent the derm to be attacked by the said acid and in moving about said skin, with care, in this liquid, until the calcareous matter has been entirely dissolved.

3. Process for the treatment of the skins of animals containing tubercles or other calcareous formations in order to decalcify the said formations without detaching them and to render the skins capable of being tanned in order to transform them into a leather capable of being worked and having the aspect of the original skin, the said process consisting in macerating the skin to be treated in a solution containing both an acid of a strength of 2 to 10 per cent, which dissolves the calcareous matter and tanning bodies which protect the derm against the action of the acid without tanning the skin in the conditions in which they are employed and in moving about said skin, with care, in this liquid, until the calcareous matter has been entirely dissolved.

4. Process for the treatment of the skins of animals containing tubercles or other calcareous formations in order to decalcify the said formations without detaching them and to render the skins capable of being tanned in order to transform them into a leather capable of being worked and having the aspect of the original skin, the said process consisting in macerating the skin to be treated in a solution containing both an acid of a strength of 2 to 10 per cent, which dissolves the calcareous matter and neutral salts in a sufficient quantity to give the solution a molecular tension which is high enough to oppose itself to swelling and to the attack of the fibres of the skin under the action of the acid and in moving about said skin, with care, in this liquid, until the calcareous matter has been entirely dissolved.

5. Process for the treatment of the skins of animals containing tubercles or other calcareous formations in order to decalcify the said formations without detaching them and to render the skins capable of being tanned in order to transform them into a leather capable of being worked and having the aspect of the original skin, the said process consisting in macerating the skin to be treated in a solution containing both an acid of a strength of 2 to 10 per cent, which dissolves the calcareous matter and neutral salts in a sufficient quantity to give the solution a molecular tension which is high enough to oppose itself to swelling and to the attack of the fibres of the skin under the action of the acid and in moving about said skin, with care, in this liquid, until the calcareous matter has been entirely dissolved in washing and in neutralizing the skin for removing the acid and tanning the said skin.

6. Process for the treatment of the skins of animals containing tubercles or other calcareous formations in order to decalcify the said formations without detaching them and to render the skins capable of being tanned in order to transform them into a leather capable of being worked and having the aspect of the original skin, the said process consisting in macerating the skin to be treated in a solution containing both an acid of a strength of 2 to 10 per cent, which dissolves the calcareous matter and neutral salts in a sufficient quantity to give the solution a molecular tension which is high enough to oppose itself to swelling and to the attack of the fibres of the skin under the action of the acid and in moving about said skin, with care, in this liquid, until the calcareous matter has been entirely dissolved in washing and in neutralizing the skin for removing the acid and tanning the said skin, then in treating the skin by means of bodies capable of impregnating the decalcified papillæ and of avoiding the exaggerate hardening when dry, in nourishing the leather and in finishing the preparation of the same by the usual processes.

In testimony whereof I have hereunto affixed my signature.

RODOLPHE ADRIEN GERMAIN.